Patented May 5, 1931

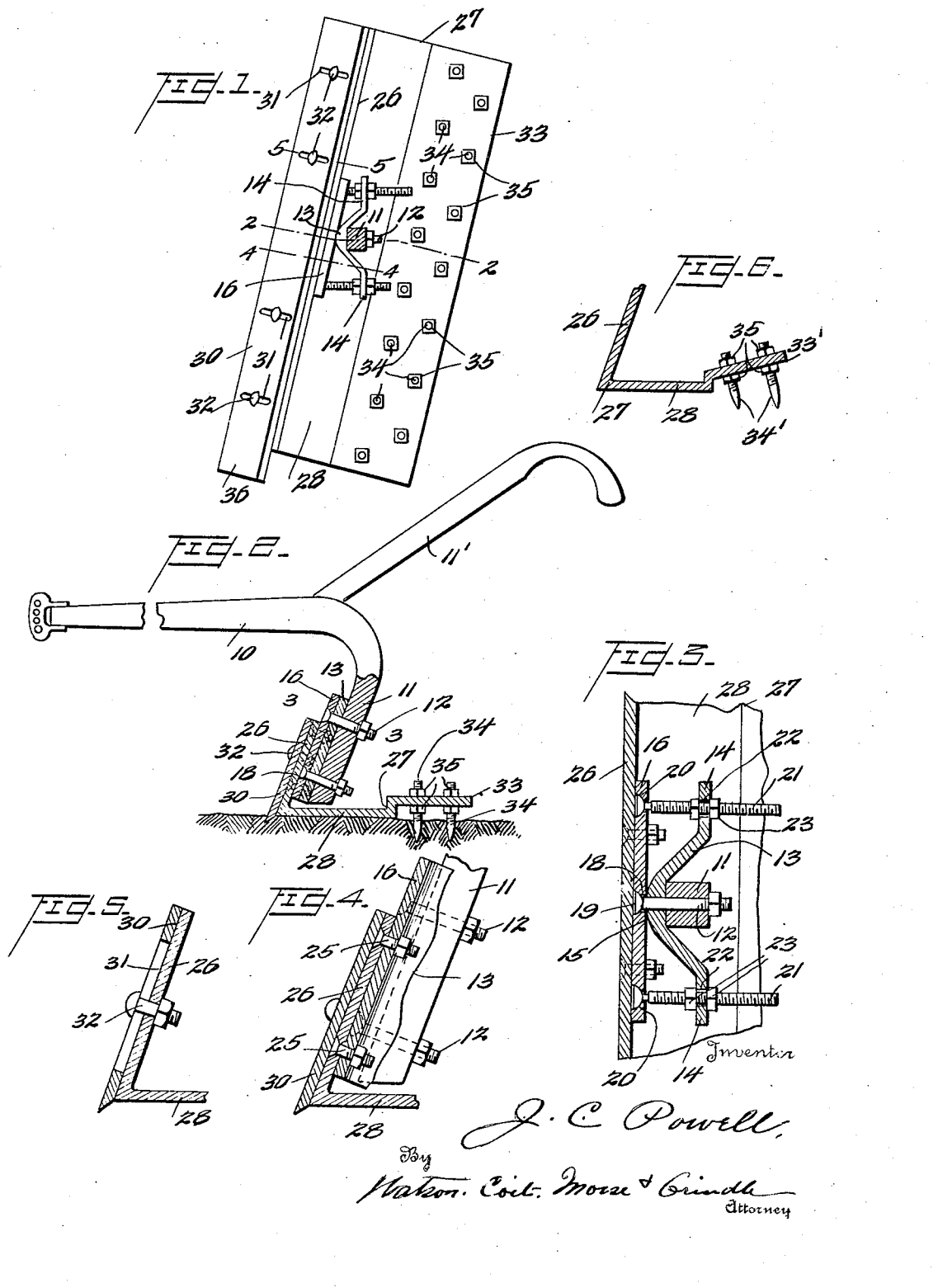
May 5, 1931.   J. C. POWELL   1,803,917
AGRICULTURAL IMPLEMENT
Filed Feb. 24, 1930

1,803,917

UNITED STATES PATENT OFFICE

JOSEPH C. POWELL, OF MINDEN, LOUISIANA

AGRICULTURAL IMPLEMENT

Application filed February 24, 1930. Serial No. 430,879.

This invention relates to agricultural implements and more particularly to a combined scraper and harrow, adapted for use in thinning or scraping cotton or other crops, weeding, or for general cultivating, harrowing, or soil stirring purposes.

An object of my invention is to provide an agricultural implement of this type which includes a novel body member adapted to be adjustably mounted upon any type of plow or cultivator stock now in use, whether in connection with a walking implement, as illustrated in the accompanying drawings, or a wheeled device which may be either horse-drawn or power driven.

Also included in the objects of my invention is the provision of means for securing the body member in angularly adjusted positions on the stock, and means for selectively and adjustably securing a scraper blade and harrow teeth to said body member.

Other objects and purposes will be apparent from the following specification when read in connection with the accompanying drawings, in which one embodiment of my invention and a slight variation thereof are set forth by way of example.

In the drawings:

Figure 1 is a top plan view of my improved implement, the stock being shown in cross-section;

Figure 2 is a side elevation of the device, a portion of the stock, the body member and its associated parts being shown in vertical section taken on line 2—2 of Figure 1;

Figure 3 is a horizontal, fragmentary cross-sectional view taken on line 3—3 of Figure 2 and showing in detail the means for securing angular adjustment of the body member;

Figure 4 is a vertical cross-sectional view taken on line 4—4 of Figure 1;

Figure 5 is a vertical cross-sectional view taken on line 5—5 of Figure 1; and

Figure 6 is a vertical cross-sectional view of another embodiment of the body member and harrow attachment.

As shown in Figure 2, the numeral 10 designates a conventional form of plow or cultivator beam which is provided with the downwardly extending stock or standard portion 11 and the handles 11'. Although for convenience of illustration this walking type of implement has been shown, it will be understood that the implements embodying the principles of my invention may be applied to any type of plow or cultivator stock whether it is integrally formed with the beam or separable therefrom, or whether it is incorporated in a wheeled or walking implement.

Secured to the front surface of the stock 11 by means of the bolts 12, is the bracket 13. The front portion of this bracket 13 has a plane rear surface which is adapted to rest against the front surface of the stock 11 so as to be rigid therewith. Bracket 13 is provided with rearwardly and outwardly extending wings which terminate in straight portions 14 which are parallel to the front surface of the stock 11. The forward surface of the mid portion of the bracket 13 is rounded as at 15 so as to provide a rocking surface for the backing or attaching plate 16. This backing plate 16 is provided with the centrally disposed perforations 18 through which the bolts 12 are adapted to pass and which are slightly wider than the diameter of the bolts 12 so as to permit a rocking movement of the plate 16. The openings 18 are spherically countersunk to provide bearing surfaces for the partly spherical heads 19 of the bolts 12. Near its side edges the plate 16 is provided with similar countersunk openings 20 to accommodate the ends of the screw adjusting bolts 21. A slightly wider clearance between the walls of the perforation 20 and shanks of the bolts 21 is required than is necessary between the opening 18 and bolt 12, since, in the rocking of the plate 16 on the surface 15, there is a greater lateral displacement of the plate 16 relatively to the bolt 21 which must be provided for. The bolts 21 pass through openings 22 in the wings 14 of the bracket 13 and are adapted to be locked in adjusted positions by means of the nuts 23.

Secured to the plate 16 by means of bolts 25 is the upwardly extending portion 26 of the body member which is generally designated by the numeral 27. This upwardly extending portion 26 is preferably inclined slightly rearwardly so that when it is attached to the standard 11 the slide portion 28 of the body member 27 will be horizontal. The front portion 26 and the slide portion 28 are preferably rectangular in plan.

A scraper blade 30 which is provided with the slots 31 is secured for vertical adjustment to the upwardly extending front portion 26 of the body member 27 by means of the bolts 32. It will be readily understood that by means of the bolts 32 and slots 31 the scraper blade may be adjusted vertically to take any depth of cut required.

Rearwardly of the slide portion 28 the body member is provided with the horizontal trailing portion 33 which is vertically offset from the plane of the slide portion 28 and is provided with a series of perforations through which are adapted to pass the harrow teeth 34. The teeth 34 are vertically adjustable in the plate 33 by means of the lock nuts 35 which are threaded on the shanks of the teeth 34 above and below the plate 33 so as to clamp the plate rigidly between them when they are tightened.

The scraper blade 30 is provided with the lateral extension 36 which protrudes beyond the upstanding portion 26 of the body member 27 so as to be disposed in front of the harrow teeth which are located at the extreme side edges of the body member, when the body member is in angularly adjusted position as shown in Figure 1. Right and left hand blades 30 may be provided for selective use in adjustment of the body member angularly about the plow stock 11 in either direction.

In Figure 6, there is shown a variation in the device in which the trailing plate 33' is directed upwardly as well as rearwardly and in which the harrow teeth 34' are graduated in length from front to rear so as to enable them to project the same distance into the ground. The other elements shown in this figure which are of the same construction as shown in the other figures are given the corresponding reference numerals. One advantage which follows as a result of the use of this variant embodiment is that the inclined plate 33' permits the earth which is stirred by the harrow teeth 34' to emerge from beneath the trailing plate 33' in a looser or less compact condition than if the plate were disposed horizontally.

My improved device can be used as a scraper alone by removing the harrow teeth, or it may be used for weeding or scraping and also for breaking or stirring the soil over which the scraper has passed by the use of the harrow teeth in conjunction with the scraper blade 30. Also, in cases where there are no weeds or grass to be removed the harrow can be used alone by the removal of the scraper blade 30. In the latter case it is preferable that the body portion be adjusted so that it extends at right angles to the path of travel of the implement. In cases where the scraper blade is used, especially where it is desired to throw some of the earth around the roots of plants, the device may be set at any desired angle in either direction.

It will be understood that the embodiments illustrated and described are susceptible of various changes and modifications within the scope of the invention as disclosed by the following claims.

Having thus described the invention, what is claimed as new and desired to be secured by Letters Patent is:

1. An agricultural implement comprising, in combination, a stock, a body member mounted on said stock for angular adjustment in a substantially horizontal plane, a scraper blade vertically adjustably mounted on the front of said body member, said body member being provided with a rearward extension, and harrow teeth mounted for vertical adjustment on said rearward extension.

2. As an article of manufacture, a body member for a combined harrow and scraper, formed from a flat metal plate and comprising a rectangular slide portion, an integral upwardly extending front portion adapted to support a scraper blade, and an upwardly offset rearward extension perforated for the reception of harrow teeth.

3. An agricultural implement comprising, in combination, a stock, a body member secured thereto for angular adjustment in a substantially horizontal plane, comprising a horizontal intermediate slide portion, an upstanding front portion integral therewith and an integral, upwardly offset, rearwardly extending portion, a scraper blade vertically adjustably mounted on said front portion and harrow teeth carried by said rearwardly extending portion.

4. An agricultural implement comprising, in combination, a body member which comprises a slide, a forward scraper portion, and a rearwardly extending upwardly inclined portion, a plurality of rows of harrow teeth carried by said last named portion, the teeth of said rows being of progressively increasing length in the rearward direction.

In testimony whereof I hereunto affix my signature.

JOSEPH C. POWELL.